No. 619,217. Patented Feb. 7, 1899.
O. H. & A. F. PIEPER.
ELECTRIC MOTOR.
(Application filed Mar. 21, 1898.)
(No Model.) 2 Sheets—Sheet 1.
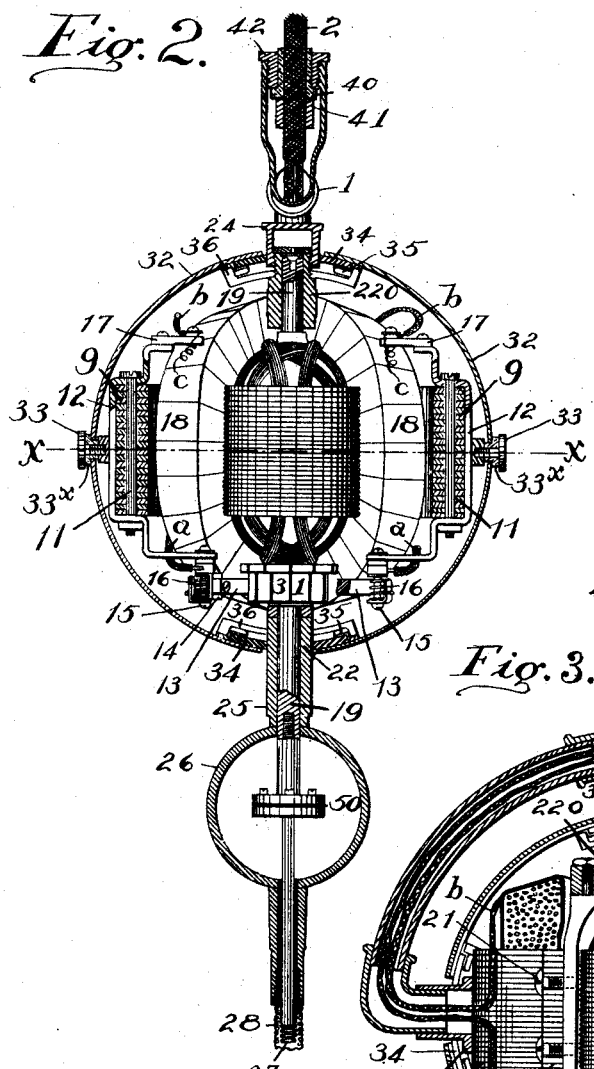
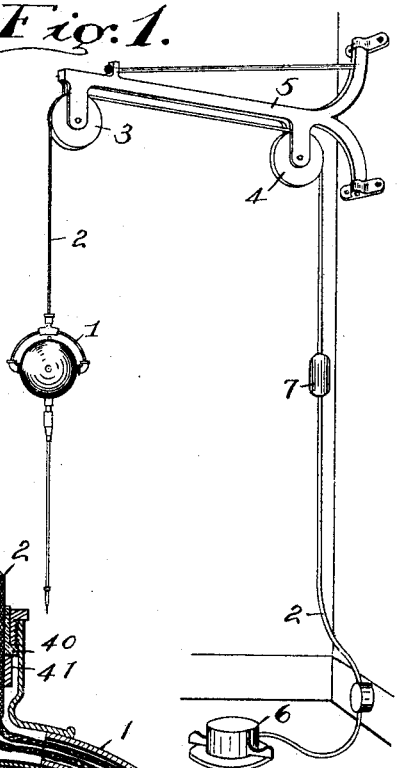
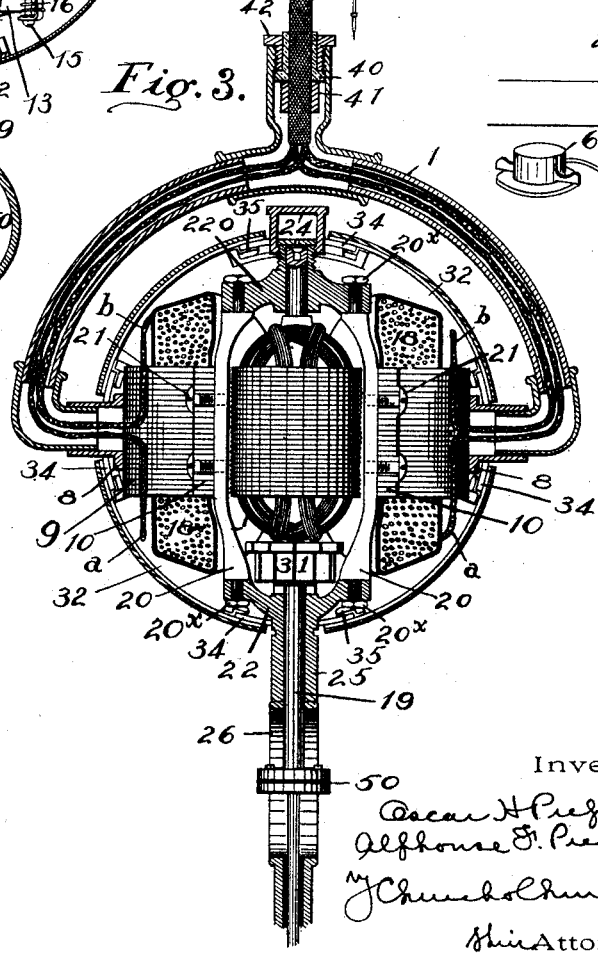
Witnesses. Inventors No. 619,217. Patented Feb. 7, 1899.
O. H. & A. F. PIEPER.
ELECTRIC MOTOR.
(Application filed Mar. 21, 1898.)
(No Model.) 2 Sheets—Sheet 2.
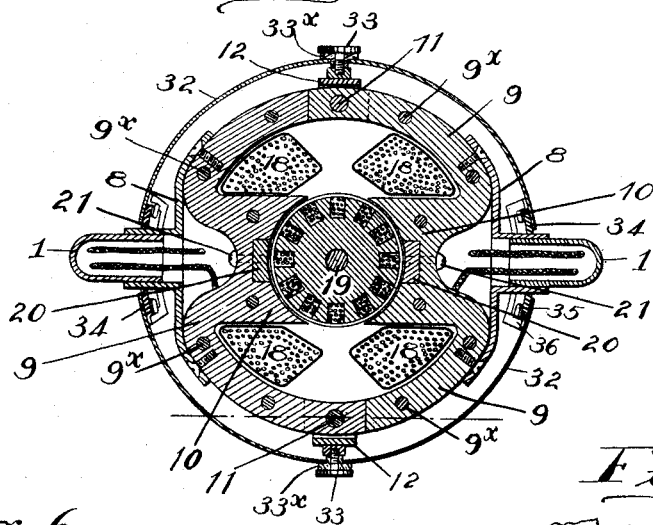
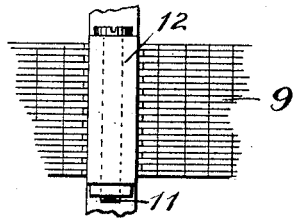
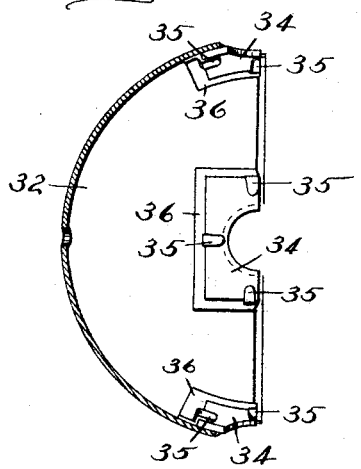
Witnesses. Inventors

UNITED STATES PATENT OFFICE.

OSCAR H. PIEPER AND ALPHONSE F. PIEPER, OF ROCHESTER, NEW YORK.

ELECTRIC MOTOR.

SPECIFICATION forming part of Letters Patent No. 619,217, dated February 7, 1899.

Application filed March 21, 1898. Serial No. 674,646. (No model.)

*To all whom it may concern:*

Be it known that we, OSCAR H. PIEPER and ALPHONSE F. PIEPER, of Rochester, in the county of Monroe and State of New York, have invented certain new and useful Improvements in Electric Motors; and we do hereby declare the following to be a full, clear, and exact description of the same, reference being had to the accompanying drawings, forming a part of this specification, and to the reference-numerals marked thereon.

Our present invention relates to improvements in electric motors particularly adapted for operating rotary tools, such as dental instruments, and to be suspended over the place of use, said motor being capable of a universal adjustment to permit the operator to work in the most convenient manner, although the motor is also capable of use for other purposes, and parts thereof are applicable to other forms, as will be understood; and to these ends the invention consists in certain improvements hereinafter described, the novel features being pointed out particularly in the claims at the end of this specification.

In the drawings, Figure 1 is a perspective view showing the motor as arranged for operating a dental engine; Fig. 2, a vertical sectional view of the motor; Fig. 3, a similar view taken at right angles to Fig. 2; Fig. 4, a horizontal sectional view on the line $xx$ of Fig. 2; Fig. 5, a detail side elevation of a portion of the field-magnet; Fig. 6, a sectional view of one of the casing-sections.

Similar reference-numerals indicate similar parts.

The motor as a whole is adapted to be used in the manner described in our prior patent, No. 562,742—that is to say, is suspended and is capable of a universal movement, being pivotally supported upon a yoke 1, adapted to be attached to a suspending-cable 2, which latter also contains the wires or conductors furnishing electrical power to the motor, said cable in the present instance extending over pulleys 3 4 on a pivoted support or arm 5 and leading to a suitable controller or switch apparatus 6.

7 indicates a weight attached to the cable beneath the pulley 4 and serving to counterbalance the weight of the motor and connected parts, though permitting the latter to be adjusted vertically and the arm 5 to swing on its pivot to move the motor into the most convenient position.

The yoke 1 is composed of hollow tubing, and its inwardly-turned ends are journaled in sockets formed in trunnions on the bearing-plates 8, secured rigidly to the field-magnet of the motor. The outer sides of the magnet are recessed opposite the sockets in the bearing-plates 8 to allow the passage of the conductors through the yoke without requiring apertures in the magnet itself, as will be described. The cable 2 embodies the outer covering portion and the internal conductors, and is attached to the yoke by means of the insulating-collar 40, encircling the cable and engaging a collar 41 on the cable, said collar 40 being clamped and held in the recess at the upper end of the yoke by the perforated screw-cap 42. The field-magnet is made in two sections, each composed of a series of semi-annular plates 9, secured together by bolts $9^\times$, and having the extensions 10 forming the pole-pieces of the magnet, the plates forming the sections having one end longer, (from the pole extension 10,) and the sections are built up by reversing adjacent plates, whereby the ends of the alternate plates of the sections may overlap and the sections be secured rigidly together by bolts 11, passed through them, forming an annular laminated magnet with interior pole-pieces. The bolts 11 also pass through plates 12, preferably composed of brass, extending above and below the field-magnet and carrying at their lower ends the commutator-brushes 13, which latter are attached to the yokes 14, pivoted on the pins 15, and held by springs 16 against the commutator on the armature; but the commutator-brushes may be swung on their yokes out of the way when it is desired to remove the armature. The upper ends of the plates 12 have insulated supports 17 thereon for the connection of the conducting-wires, as will be described.

18 18 indicate the field-coils, encircling the pole-pieces of the magnet, formed by the extensions 10 on the plates, curved to conform to the interior circumference of the field-magnets and adapted to be separately applied to the pole-pieces when the armature and its supporting parts are removed, the space between said pole-pieces being slightly greater than the depth of the coils.

The frame for supporting the armature-shaft 19 embodies the two rods or bars 20, passing through the magnet, as shown, and secured in recesses formed in the face of the pole-pieces by securing-screws 21, passing through the magnet from the outer side, as shown, said bars 20 having the ends threaded and passing through apertures in the bearing pieces or yokes 22 220, in which the armature-shaft has its bearing, nuts 20$^\times$ on the ends of the bars holding the yokes in place. The upper bearing-yoke 220 is provided with an interiorly-threaded plunger or cap 24 for receiving a solid lubricant and forcing it into the bearing for the upper journal of the shaft, and the lower yoke 22 is provided with the sleeve or extension 25, to which is secured a ring 26, and also serving for the attachment of the casing 28 of the flexible shaft 27, the coupling 29 between the armature-shaft and the flexible shaft being arranged in said ring, as shown.

In order that the tool and the shaft carrying it may be effectually insulated and so that the patient may not receive a shock, we arrange a plate 50 of insulating material between the armature-shaft and the flexible shaft, and the sleeve at the end of the shaft-casing 28 is of hard rubber or other suitable insulating material.

The armature 30 may be of any suitable construction and is secured rigidly upon its shaft and provided with the commutator 31, with which the brushes 13 coöperate. The bars 20, it will be noted, are curved slightly toward each other at the ends, and thereby permit the field-coils to extend nearly to the ends of the pole-pieces, at the same time shortening the bearing-yokes and making the parts more compact. The conducting-wires leading to the motor, as before stated, pass through the suspending-cable and enter the motor-frame through the ends of the suspending-yoke, the outer sides of the magnet being recessed to permit this, as shown, and while single conductors may be employed and the field and armature be connected in series or in multiple arc, it is desirable in motors of this character that the controlling devices be capable of varying the speed of and also of reversing the motor, as desired, and we therefore prefer to have two conducting-wires pass through each of the arms of the suspending-yoke, the wires $a$ passing to the commutator-brush and the wires $b$ to the insulating-plates 17, where they are connected with the wires $c$, forming the terminals of the field-coils.

From the above construction it will be seen that the plates forming the field-magnet may be stamped from sheet metal, and as they are similar only one set of dies is required, that the field-magnets may be readily formed by bolting these sections together in the manner indicated, and that the armature and its supporting-frame as a whole may be inserted within the field-magnet and secured in position by the screws 21 and may be readily removed when desired for adjustment or repair. It is desirable, though not necessary, that the rear sides of the magnet-plates 9 be recessed, as shown.

The operating parts of the motor are inclosed within a suitable casing formed of hemispherical sheet-metal sections 32, secured to the plates 12 on the magnet by screws 33, passing through apertures in their centers and also through rubber or leather washers 33$^\times$, arranged between the sections and the motor-frame, said covering-plates having lapping edges, and in order to reduce the noise incident to the operation of the motor we provide at the recessed edges of the casing-plates, where they would otherwise contact with the trunnions or supports and the armature-frame, deafening or packing washers 34, of leather of other non-resonant material, having semi-annular recesses to fit the parts secured to the sections of the casing by means of fingers 35, formed on plates 36, attached to the sections, and which fingers are turned over the edges of washers to hold them in position. Either or both of these casing-sections may be removed when desired, and when in place they serve not only to give the machine a symmetrical appearance but also to prevent the entrance of dust to the operating parts, this last result being contributed to by the soft-packing strips, which form dust-proof connections between the casings and the supporting-yoke and motor-frame. The plunger 24 may be adjusted to lubricate the armature-shaft bearing without removing the casing, its upper end projecting, as shown.

The motor as a whole may be raised and lowered and turned on its supporting yoke, or the yoke itself may be turned, this universal movement enabling the operator to present the tool and work to the best advantage.

The construction whereby the armature-frame and its connected parts are detachably connected inside of the annular field-magnet is particularly desirable in an apparatus adapted to be suspended, and this feature could well be adapted with good effect to stationary motors or generators, as it renders the apparatus very compact.

We claim as our invention—

1. An annular magnet for motors, &c., embodying two sections, each composed of separate plates secured together and having the projections forming the interior pole-pieces and the exterior depressions, the ends of said plates lapping, means for securing the lapped ends together, and the bearing-plates on the magnet opposite the exterior depressions.

2. The combination with the annular magnet having depressions in the outer sides, of the bearing-plates on the magnet bridging said depressions, and having sockets and a hollow supporting-frame engaging the sockets in the plates and permitting the tilting of the magnet thereon.

3. The combination with the annular magnet having the depressions in the outer sides, of the bearing-plates on the magnet bridging said depressions, an armature and shaft carried by the magnet, and the supporting-yoke journaled on the bearing-plates.

4. The combination with the magnet and means for supporting it, of the separate armature-frame extending through the magnet and secured thereto, and the armature rotating in the magnet.

5. The combination with the annular magnet, of the complete armature-frame extending through the magnet and secured thereto, the armature rotating in the frame and a suspending-yoke pivotally connected to the magnet.

6. The combination with the magnet having the interior pole-pieces provided with grooves in their faces, the field-coils and the armature-frame extending through the magnet and attached to the pole-pieces, of the armature rotating in the frame.

7. The combination with the annular magnet having the interior pole-pieces, and the field-coils thereon, of the armature-frame embodying the bars extending through and secured to the magnet and having the bearing-yokes at opposite ends and the armature-shaft journaled in said bearings.

8. The combination with the annular magnet and the field-coils, of the armature-frame extending through the magnet and connected thereto, the ring extension on said frame, and a flexible shaft and casing supported upon said extension, the armature-shaft journaled in the frame, the armature thereon, and a coupling between the armature-shaft and the flexible shaft.

9. The combination with the annular magnet, a support on which it is pivoted and the field-coils, of an armature-frame extending through the magnet and secured thereto, the armature-shaft mounted in the frame, the armature thereon, a flexible shaft connected to and supported by the armature-frame, and connections between the flexible and armature shafts.

10. The combination with the annular magnet having the internal pole-pieces and the coils thereon, the bars extending through the magnet and connected to the pole-pieces, the bearing-yokes connecting the ends of said bars, one of said yokes having the ring extension and the sleeve beyond it, the armature-shaft journaled in the bearing-yokes, and the armature thereon.

11. A magnet for motors, &c., consisting of connected sections, each section being composed of the segmental plates 9 having the extensions 10 nearer one end than the other, the adjacent plates of each section being reversed whereby the extensions 10 are in line and the longer ends of the plates of one section are fitted between the longer ends of the plates of the other section, and means for securing the lapped ends of the plates together.

12. The segmental plate 9 for forming ring-magnets embodying the pole extension 10 on the inner side arranged nearer one end of the plate than the other, substantially as described.

13. The combination with the annular magnet consisting of the segmental sections having lapping ends, the bolts securing said sections, and the plates secured by the bolts, and the commutator-brushes thereon, of the armature-frame secured in the magnet and the armature having the commutator.

14. The combination with the annular magnet having the internal pole-pieces, the removable armature-frame embodying the connected bearings for the ends of the armature-shaft passing through the magnet and connected thereto, and the armature rotating in said frame and having the commutator thereon, of the supports secured to the magnet independently of the armature-frame and the movable commutator-brushes thereon.

15. The combination with the suspending-yoke, the annular magnet pivoted thereon, and the armature-shaft, of the casing-sections, and the packing-washers 34 of non-resonant material, such as leather, arranged between the casing and magnet.

16. The combination with a motor, of a casing embodying separable parts secured thereto, and sound-deadening washers of non-resonant material interposed between the edges of the casing-sections, and motor-frame, where the latter extends through the casing.

17. The combination with the motor having the trunnions, of the hemispherical casing-sections having the semicircular apertures and the washers 34 secured to the casing and extending around the trunnions.

18. The combination with a motor, of a casing-section, the fingers 35 thereon, and the segmental washers 34 held by the fingers and adapted to coöperate with the motor.

19. In an electric motor for dental engines and similar instruments, the combination with the motor-frame, an armature rotating thereon, a shaft-casing supported on the frame, and a section of insulating material arranged in the connection between the casing and the frame, of a flexible shaft arranged in the flexible casing and a non-conducting coupling between said shaft and the armature-shaft.

20. The combination with the motor having the rotary armature-shaft and the inclosing casing, of the journal-box for the end of the shaft, having the thread and the adjustable threaded plunger for forcing semisolid lubricant into the bearing, said adjustable plunger being accessible and capable of operation from the extension of the casing.

OSCAR H. PIEPER.
ALPHONSE F. PIEPER.

Witnesses:
F. F. CHURCH,
F. E. WILLIAMS.